(12) United States Patent
Heim et al.

(10) Patent No.: US 7,733,575 B2
(45) Date of Patent: Jun. 8, 2010

(54) OPTICAL SYSTEMS EMPLOYING COMPLIANT ELECTROACTIVE MATERIALS

(75) Inventors: Jonathan R. Heim, Pacifica, CA (US); Alireza Zarrabi, Santa Clara, CA (US)

(73) Assignee: Artificial Muscle, Inc., Sunnyvale, CA (US)

( * ) Notice: Subject to any disclaimer, the term of this patent is extended or adjusted under 35 U.S.C. 154(b) by 0 days.

(21) Appl. No.: 12/128,576

(22) Filed: May 28, 2008

(65) Prior Publication Data
US 2009/0021823 A1 Jan. 22, 2009

Related U.S. Application Data

(60) Provisional application No. 60/941,222, filed on May 31, 2007.

(51) Int. Cl.
G02B 3/12 (2006.01)
(52) U.S. Cl. .................................... 359/665
(58) Field of Classification Search ......... 359/290–297, 359/665–667
See application file for complete search history.

(56) References Cited

U.S. PATENT DOCUMENTS

| | | | |
|---|---|---|---|
| 4,784,479 A * | 11/1988 | Ikemori ...................... | 359/666 |
| 5,684,637 A | 11/1997 | Floyd | |
| 6,286,961 B1 | 9/2001 | Ogawa | |
| 6,369,954 B1 | 4/2002 | Berge et al. | |
| 6,619,799 B1 | 9/2003 | Blum et al. | |
| 6,733,130 B2 | 5/2004 | Blum et al. | |
| 6,847,155 B2 * | 1/2005 | Schwartz et al. ............ | 310/328 |
| 6,952,313 B2 | 10/2005 | Schrader | |
| 7,142,368 B2 | 11/2006 | Kim et al. | |
| 7,142,369 B2 | 11/2006 | Wu et al. | |
| 7,170,665 B2 | 1/2007 | Kaneko et al. | |
| 7,245,440 B2 | 7/2007 | Peseux | |
| 7,256,943 B1 * | 8/2007 | Kobrin et al. ............... | 359/666 |
| 7,298,559 B2 | 11/2007 | Kato et al. | |
| 2005/0002113 A1 | 1/2005 | Berge | |
| 2005/0140922 A1 | 6/2005 | Bekerman et al. | |
| 2006/0126190 A1 | 6/2006 | Berge et al. | |
| 2006/0152814 A1 | 7/2006 | Peseux | |
| 2006/0164731 A1 | 7/2006 | Wu et al. | |
| 2006/0208609 A1 | 9/2006 | Heim | |
| 2006/0221458 A1 | 10/2006 | Kato et al. | |
| 2007/0002455 A1 | 1/2007 | Berge et al. | |
| 2007/0030573 A1 | 2/2007 | Batchko et al. | |
| 2007/0070491 A1 | 3/2007 | Jacob | |
| 2007/0216803 A1 | 9/2007 | Eromaki | |
| 2008/0144185 A1 * | 6/2008 | Wang et al. ................. | 359/665 |

OTHER PUBLICATIONS

U.S. Appl. No. 60/194,817, filed Apr. 5, 2000, Kornbluh et al.

* cited by examiner

*Primary Examiner*—Darryl J Collins
(74) *Attorney, Agent, or Firm*—Levine Bagade Han LLP

(57) ABSTRACT

The present invention provides optical systems, devices and methods which utilize one or more electroactive films to adjust an optical parameter of the optical device/system.

23 Claims, 11 Drawing Sheets

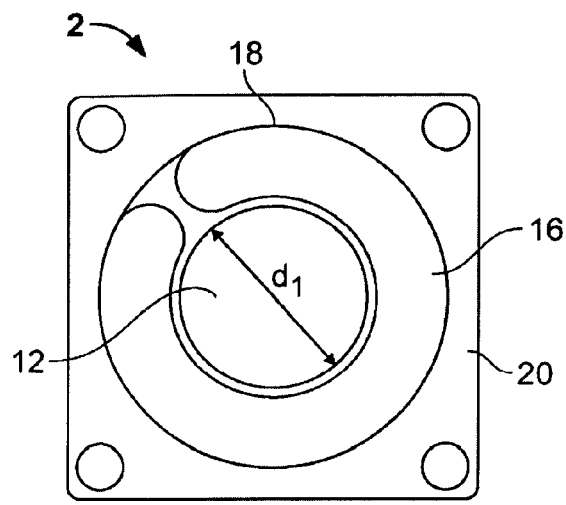 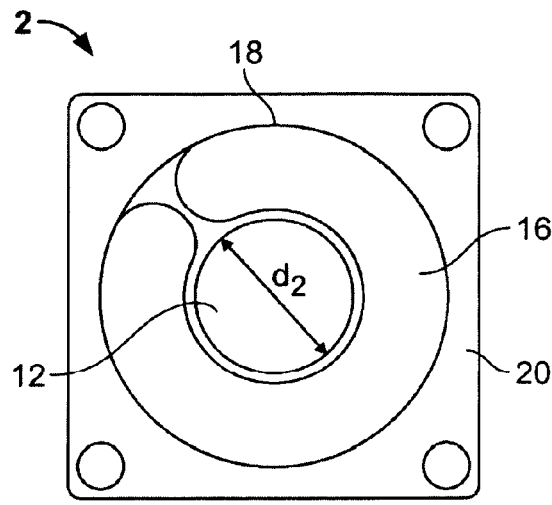
FIG. 3A  FIG. 4A
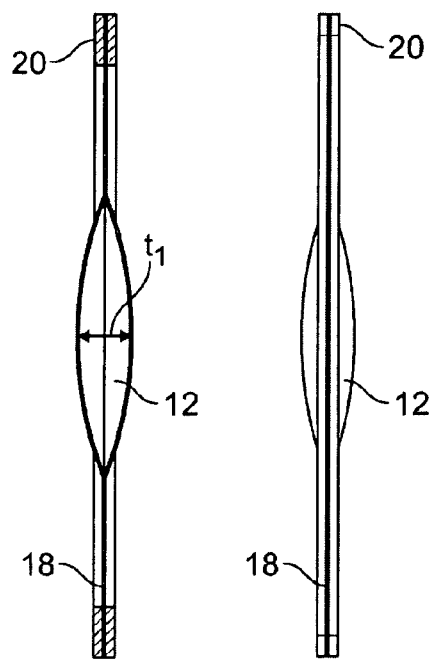 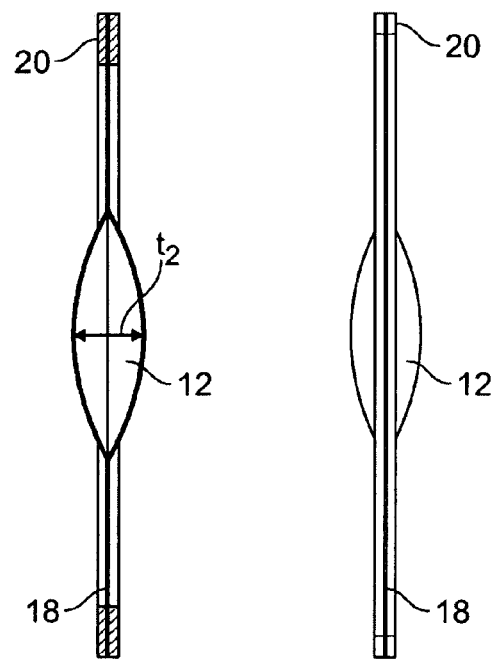
FIG. 3B  FIG. 3C  FIG. 4B  FIG. 4C

OPTICAL SYSTEMS EMPLOYING COMPLIANT ELECTROACTIVE MATERIALS

FIELD OF THE INVENTION

The present invention relates to adjustable optical systems. In particular, it relates to the use of compliant electroactive materials to construct an optical system having a compact form factor.

BACKGROUND

In conventional optical systems, such as in digital cameras, motors and solenoids are used as sources of power to displace gears and cams which act upon optical elements, e.g., lenses, to provide focusing, zoom, and shake prevention. There are many disadvantages to such conventional systems—power consumption is high, response times are long, accuracy is limited and space requirements are high.

Advancements in miniaturized technologies have led to high-quality, highly-functioning, light-weight portable devices, and an ever-increasing consumer demand for even further improvements. An example of this is the development of cellular telephones to include a camera, often referred to as camera phones. While the majority of such camera phones employ an all-mechanical lens module having a small form factor lens, this approach does not offer variable or auto-focusing and zoom capabilities due to the significant number of moving parts required. For example, zoom capability requires a combination of lens elements, a motor, and a cam mechanism for transmitting the rotational movement of the motor to linear movement in order to adjust the relative positions of the lenses and an associated image sensor in order to obtain the desired magnification. In addition to the motor and cam mechanism, a plurality of reduction gears are is used to accurately control the relative positioning of the lenses.

Thus, while variable focusing and zoom features are possible within a camera phone and other optical systems having a relatively small form factor, these features would add substantially to the overall mass of these devices. Further, due to the necessity of an extensive number of moving components, power consumption is significantly high and manufacturing costs are increased.

Another approach which reduces the number of parts and mass of an optical system involves the use of a liquid lens to provide variable focusing and zoom capabilities. With such liquid lens systems, the volume of the fluid in the lens may be varied to adjust the focal length of the lens. This adjustment can be done without moving the lens, thus it is possible to realize zoom and variable focusing functions without a motor and cam mechanism.

One type of liquid lens system involves the pumping of liquid into and out of a lens chamber to change the curvature of an elastic membrane surface which defines at least a portion of the lens chamber. The transfer of fluid into and out of the lens chamber may be accomplished strictly by mechanical means, as described in U.S. Pat. Nos. 5,684,637 and 6,715,876 and U.S. Patent Application Publication No. 2007/0030573 (see, e.g., the embodiment of FIGS. 6A-6C in the latter patent document). For these types of lens systems, a complicated control system is usually needed. Such a control system involves additional moving components to pump and evacuate fluid into the lens chamber, making these types of lens systems bulky, expensive and sensitive to vibration. Another variation of such a liquid lens system is described in U.S. Patent Application Publication No. 2007/0030573. This system involves the pumping of fluid in and out of a lens chamber having a compliant membrane, the fluid movement of which is accomplished by electromechanical means (see, e.g., the embodiment of FIGS. 7-9C of that patent document). While the use of an electromechanical actuator may reduce the number of components required for the liquid lens system, by requiring the use of a liquid reservoir in addition to the liquid chamber which defines the lens, the bulkiness and mass of the system remain less than desirable.

Rather than changing the volume of liquid within a lens to effect a change in its shape, another type of liquid lens employs a fixed volume of liquid. One example of such a system is disclosed in U.S. Patent Application Publication No. 2006/0164731 in which a sealed liquid lens is attached about its periphery to an impeller structure which imparts movement and pressure to the fluid filled lens. The impeller structure is made of a number of movable thin plates fastened at regular intervals around the lens. The impeller can be operated mechanically or electro-mechanically to change the diameter of the lens which, in turn, results in a change in radius of the optical surface of the liquid lens. While the size of the lens system may be reduced by the elimination of an additional liquid reservoir, the number of moving parts required of such an impeller mechanism adds mass to the system and presents reliability issues.

Other variable-focus liquid lens systems utilizing a fixed volume of fluid are known which employ electrowetting principles. Two producers of liquid lenses, Varioptic of France and Philips Electronics of the Netherlands, have developed such a lens system which employs two immiscible (non-mixing) liquids, one an electrically conductive solution and the other a non-conductive fluid, having different refractive indices. With the operative placement of electrodes, a voltage applied thereto modifies the curvature of the interface between the liquids. More specifically, by modulating the electric field across the interface, its surface tension is caused to change thereby altering its radius of curvature and focusing light rays passing therethrough to either a greater or lesser extent. In other words, the shape of the lens can be made to transition between convergent (concave) and divergent (convex) states and back again. Changing the shape of the lens changes the curvature radius of the lens, allowing the focal length to be changed freely. Examples of such liquid lenses are disclosed in U.S. Pat. No. 6,369,954 and U.S. Patent Application Publication Nos. 2006/0126190, 2006/0152814 and 2007/0002455. While providing a reduced form factor over the all-mechanical lens positioners, these types of liquid lens systems have significant drawbacks. Typically, the voltage required to effect the desired focal change upon the liquid lens is very high (>250 volts). This results in relatively high power consumption which in turn reduces the potential life of the battery used or, alternatively, requires a larger battery. Further, as this type of lens structure requires the use of two liquids, it is fairly complicated and expensive to construct.

Accordingly, it would be advantageous to provide an optical lens system which overcomes the limitations of the prior art. It would be particularly advantageous to provide such a system whereby the arrangement of and the mechanical interface between a fluidic or liquid lens and its actuator structure were highly integrated so as to reduce the form factor as much as possible. It would be greatly beneficial if such an optical system involved a minimal number of mechanical components, thereby reducing the complexity and fabrication costs of the system. Additionally, it would be highly desirable if such a system could effect a relatively large change in the optical properties of its liquid lens while requiring a relatively small work load, i.e., movement or stroke, on the part of the lens actuator.

SUMMARY OF THE INVENTION

The present invention includes optical systems and devices and utilizing one or more electroactive films to adjust a parameter of the optical device/system. The devices and systems contain one or more optical elements that may function as lenses having auto-focus and/or zoom capabilities. The optical elements may also be used to define an aperture or shutter of an optical system which can be adjusted to control the amount of light passing to a separate lens element. In many variations, activation of the electroactive film(s) affects a dimension of the lens element, wherein the dimension is a thickness, diameter or volume. In certain embodiments, the electroactive film is a component of the lens element where, in others, the electroactive film is remotely positioned from the lens element.

In one variation, the optical elements include a transparent and/or translucent membrane and at least one electroactive film disposed about at least a portion of the transparent membrane. In certain embodiments, the transparent/translucent membrane is a made of a dielectric material which forms a component of the electroactive film. The membrane may be employed as a light-passing aperture of a lens device. In other optical applications, the membrane defines a fluidic chamber which contains optical fluid to provide a liquid lens element. The diameter or volume of the optical fluid may be fixed or variable. In either configuration, the thickness of the lens chamber is variable to adjust the focal length of the lens.

The electroactive films used in the subject optical devices and systems include at least one opaque region, e.g., an electroded region, and at least one transparent and/or translucent region, e.g., bare dielectric material, wherein activation of the film changes a surface area dimension of the transparent/translucent region relative to a surface area dimension of the opaque region. Such a change in surface area may be employed to modulate the amount of light passing through the transparent region. The configuration of the intersection (e.g., straight, curved, etc.) between the opaque region and the transparent region may vary from application to application.

An optical system of the present invention includes at least one fluidic lens and at least one electroactive film associated with the at least one fluid lens, wherein activation of the at least one electroactive film affects an optical parameter, e.g., focal length or magnification (zoom), of the fluidic lens. Certain of the subject optical system include a focusing lens component as well as an afocal lens component, wherein at least one of the lens elements includes a fluidic lens. Where the afocal lens component utilizes a fluidic lens, the linear position of the fluidic lens, in certain embodiments, remains constant upon activation of an electroactive film, with the lens thickness being adjusted to affect magnification. These systems may include any number of lenses where any suitable combination of fluidic and solid lenses may be employed.

The present invention also includes methods for using the subject devices and systems. Other methods are directed to using optical elements of the present invention to focus and/or magnify an image, or to control the amount of light exposed to a lens. In one variation of a subject method of focusing an image using a lens element, the method includes providing a fluidic lens comprising a fluid-filled chamber having flexible transparent and/or translucent walls and activating an electroactive film to adjust the thickness of the chamber thereby adjusting a focal length of the fluidic lens. In one particular embodiment, the electroactive film surrounds at least a portion of a perimeter of the chamber, wherein activating the electroactive film includes changing a diameter dimension of the chamber. In another embodiment, the electroactive film is configured as a pump, wherein activating the electroactive film comprises pumping fluid to effect a change in the volume of fluid within the chamber. A similar method involves magnifying an image by activating an electroactive film to adjust the thickness of the chamber where the chamber forms an element of an afocal lens assembly.

These and other features, objects and advantages of the invention will become apparent to those persons skilled in the art upon reading the details of the invention as more fully described below.

BRIEF DESCRIPTION OF THE DRAWINGS

The invention is best understood from the following detailed description when read in conjunction with the accompanying schematic drawings, where variation of the invention from that shown in the figures is contemplated. To facilitate understanding of the invention description, the same reference numerals have been used (where practical) to designate similar elements that are common to the drawings. Included in the drawings are the following figures:

FIGS. 3A-3C provide planar, cross-sectional and side views, respectively, of the fluidic optical lens system of FIGS. 1A-1C when in an inactive (voltage off) state;

FIGS. 4A-4C provide planar, cross-sectional and side views, respectively, of the fluidic optical lens system of FIGS. 1A-1C when in an active (voltage on) state;

DETAILED DESCRIPTION OF THE INVENTION

Before the devices, systems and methods of the present invention are described, it is to be understood that this invention is not limited to a particular form fit or applications as such may vary. Thus, while the present invention is primarily described in the context of a variable focus camera lens, the subject fluidic optical systems may be used in microscopes, binoculars, telescopes, camcorders, projectors, eyeglasses as well as other types of optical applications. It is also to be understood that the terminology used herein is for the purpose of describing particular embodiments only, and is not intended to be limiting, since the scope of the present invention will be limited only by the appended claims.

Figure 1A:
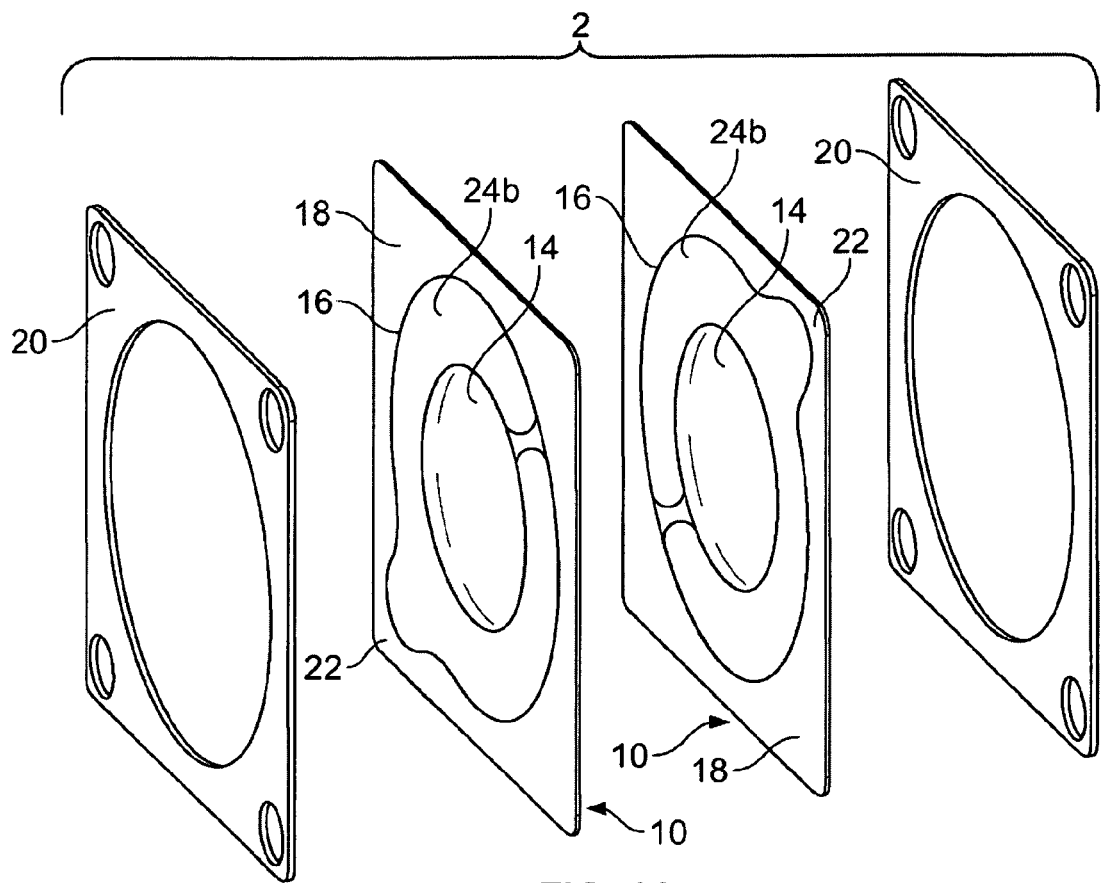
FIGS. 1A-1C provide exploded, cross-sectional and side views, respectively, of a fluidic optical lens system of the present invention having a fixed volume of fluid, which is employable as an adjustable-focus lens.
Figure 1B:
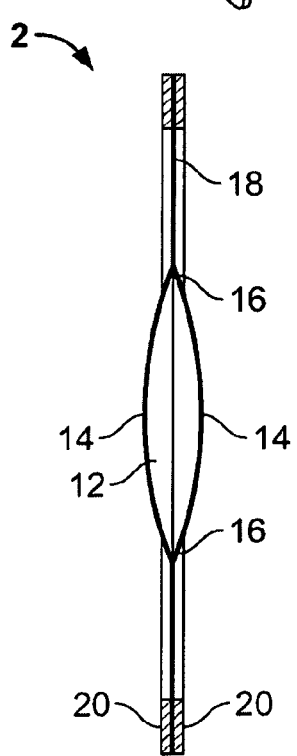
Figure 1C:
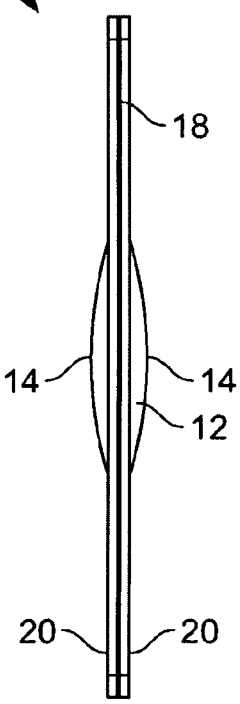

Referring now to the drawings, and to FIGS. 1A-1C in particular, there is illustrated a fluidic optical system 2 of the present invention having auto-focus capabilities. Optical system 2 includes electroactive films 10, each including a dielectric layer 18, a portion of which is sandwiched between two electrode layers 24, with the high voltage electrodes of each film 10 facing each other and the grounded electrodes facing outward. Each electroactive film has an electrical contact portion 22 configured for electrical connection to a voltage source (not shown). While a two-ply film configuration is illustrated, a single-ply film configuration may also be employed; however, the two-ply structure minimizes the risk of arcing from the high voltage electrode. Where just a single active film is used, a separate non-active film may be needed to fully enclose the fluid chamber. Notwithstanding, there may be instances where a single film is advantageous. Further, more than two layers may be employed, for example, where additional force is needed. Configurations having more than two layers of electroactive film may also allow for an asymmetrical lens shape where the stiffness of the films may vary from each other to enable such asymmetry. The structure and function of the electroactive films are discussed in greater detail below with reference to FIGS. 2A and 2B.

Disposed centrally within each film 10 is a transparent and/or translucent membrane 14 which, when sealed together about their perimeters 16 as shown in FIGS. 1B and 1C, define a liquid lens 12. More specifically, the sealed membranes 14 define a chamber which encapsulates an optical fluid. The perimeter 16 of lens 12 is sealed by means of an adhesive or the membranes 14 themselves may be made of a material that is self-adhesive, e.g., acrylic, silicone, epoxy, cyanoacrylate, etc. The sealed perimeter 16 may solely include membranes 14, solely include the electroactive films 10 or include portions of both materials. Where sealed perimeter 16 includes electroactive films 10, electrodes 24 may be spaced a selected distance from membranes 14 to expose respective inner annular portions of the dielectric layers 18. Also, the dielectric layer 18 of each film may itself be made of a transparent/translucent material with a central portion defining optical membrane 14. Depending on the application at hand, the optical membrane may be transparent without being translucent, or visa versa, or may be both transparent and translucent. Unless specified otherwise, the terms are used interchangeably herein. In any embodiment, the optical membranes and electroactive films collectively define a diaphragm which is stretched and held about its perimeter by a frame or is otherwise sandwiched between two opposing open frame sides 20. While frame 20 is illustrated having a square configuration, any suitable configuration may be used.

The composite structure which forms lens system 2 may be referred to as a cartridge. The cartridge, which may have any suitable form fit and size, may be incorporated into many types of optical devices, such as those listed above. In some embodiments, it is desirable for the cartridge structure 2 to have a size suitable for use in digital cameras, cell phone cameras or other small mobile devices. For example, for use in a cell phone, frame 20 may have a width, length or diameter dimension in the range from about 5 to about 15 millimeters and have a thickness in the range from about 0.1 to about 1 millimeters; and lens 12 may have a diameter in the range from about 1 to about 25 millimeters and a lens radius (when in an inactive condition) in the range from about 0.1 to infinity (i.e., nearly flat).

The fluid used within lens 12 may be a liquid or gel, and typically has a refractive index between about 1.1 and about 3.0, depending on the application. The fluid desirably has a viscosity of about 0.1 to about 100 centipoises over a temperature range from about −10° C. to about 80° C. Fluids which have these properties and are suitable for use with the present invention include but are not limited to silicone oil, e.g., Bis-Phenylpropyl Dimethicone. The fluid may include dopants, dyes, pigments, particles, nanoparticle and/or chemical elements that serve to modify the transmissive optical properties of the fluid. For example, it may be desirable in certain camera applications for the fluid to include infrared absorbing particles or pigments that serve as a filter to prevent infrared wavelengths of about 670 nm and greater from being transmitted through the fluidic lens while allowing visible wavelengths to be transmitted generally without loss.

As the transparent/translucent membranes 14 act as optical interfaces disposed between the lens fluid and the external environment within which the lens 12 is disposed, it is preferable if they have a refractive index matched, i.e., equal or nearly equal, to that of the optical fluid in order to minimize scattering of light at their interface. In many applications, the external environment will be air at standard atmospheric pressure. However in certain applications it may be desirable to dispose the lens in other external environments, including, for example, vacuum, pressurized gas, plasma or liquid. At least one and often both of the two membranes 14 which define the lens chamber preferably have properties suitable for use in a variable focal length lens. Specifically, the membrane material should be sufficiently elastic, rugged, and transparent to radiation in a frequency range of interest, e.g., visible light. Additionally, the membrane material should be durable enough to have a lifetime suitable for its application. For example, in a cell phone camera application, the membrane material should have a lifetime of several years and be able to survive about one million cycles of operation. Suitable membrane materials for use with the present invention include but are not limited to silicone-based polymers, such as poly(dimethylsiloxane) (PDMS), or a polyester material, such as PET or Mylar™.

Figure 2A:
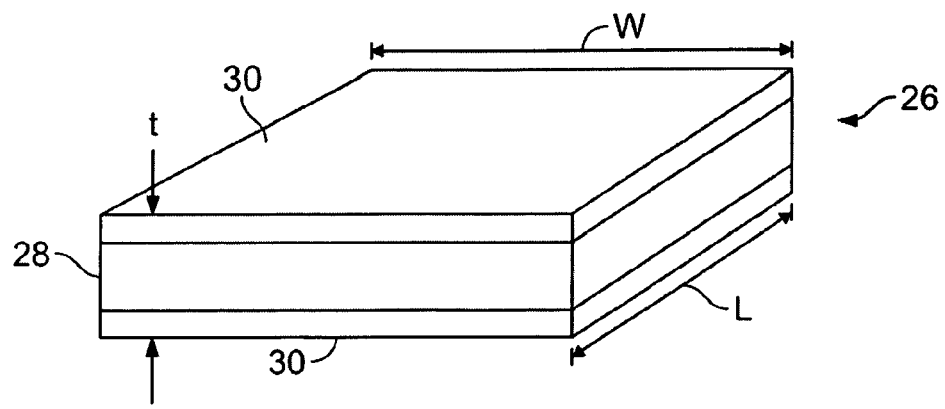
FIGS. 2A and 2B provide schematic illustrations of an electroactive polymer film for use with the optical systems of the present invention before and after application of a voltage.
Figure 2B:
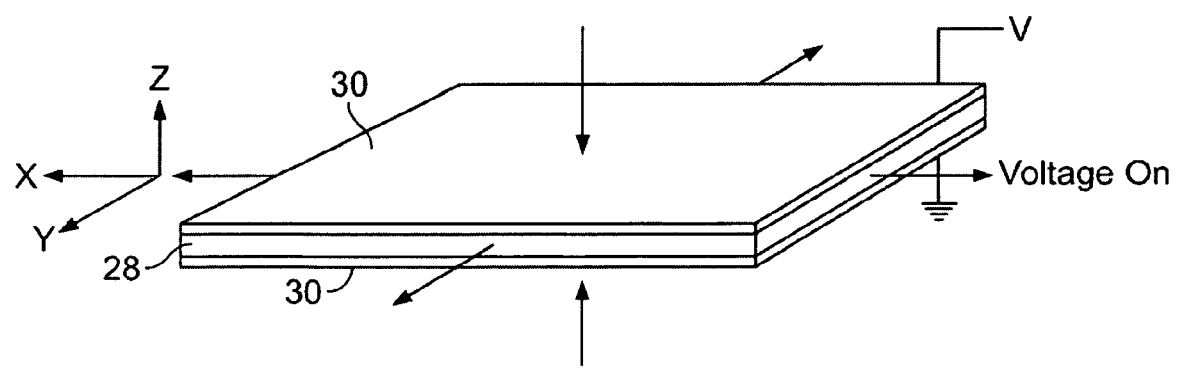

As illustrated in the schematic drawing of FIGS. 2A and 2B, electroactive film 26 comprises a composite of materials which includes a thin polymeric dielectric layer 28 sandwiched between compliant electrode plates or layers 30, thereby forming a capacitive structure. As seen in FIG. 2B, when a voltage is applied across the electrodes, the unlike charges in the two electrodes 30 are attracted to each other and these electrostatic attractive forces compress the dielectric layer 28 (along the Z-axis). Additionally, the repulsive forces between like charges in each electrode tend to stretch the dielectric in plane (along the X- and Y-axes), thereby reducing the thickness of the film. The dielectric layer 28 is thereby caused to deflect with a change in electric field. As electrodes 30 are compliant, they change shape with dielectric layer 28. Generally speaking, deflection refers to any displacement, expansion, contraction, torsion, linear or area strain, or any other deformation of a portion of dielectric layer 28. Depending on the form fit architecture, e.g., the frame in which capacitive structure is employed, this deflection may be used to produce mechanical work. The electroactive film 26 may be pre-strained within the frame to improve conversion between electrical and mechanical energy, i.e., the pre-strain allows the film to deflect more and provide greater mechanical work.

With a voltage applied, the electroactive film 26 continues to deflect until mechanical forces balance the electrostatic forces driving the deflection. The mechanical forces include elastic restoring forces of the dielectric layer 28, the compliance of the electrodes 30 and any external resistance provided by a device and/or load coupled to film 26. The resultant deflection of the film as a result of the applied voltage may also depend on a number of other factors such as the dielectric constant of the elastomeric material and its size and stiffness. Removal of the voltage difference and the induced charge causes the reverse effects, with a return to the inactive state as illustrated in FIG. 2A.

The length L and width W of electroactive polymer film 26 are much greater than its thickness t. Typically, the dielectric layer 28 has a thickness in range from about 1 μm to about 100 μm and is likely thicker than each of the electrodes. It is desirable to select the elastic modulus and thickness of electrodes 30 such that the additional stiffness they contribute to the actuator is generally less than the stiffness of the dielectric layer, which has a relatively low modulus of elasticity, i.e., less than about 100 MPa.

Classes of electroactive polymer materials suitable for use with the subject optical systems include but are not limited to dielectric elastomers, electrostrictive polymers, electronic electroactive polymers, and ionic electroactive polymers, and some copolymers. Suitable dielectric materials include but are not limited to silicone, acrylic, polyurethane, flourosilicone, etc. Electrostrictive polymers are characterized by the non-linear reaction of electroactive polymers. Electronic electroactive polymers typically change shape or dimensions due to migration of electrons in response to electric field (usually dry). Ionic electroactive polymers are polymers that change shape or dimensions due to migration of ions in response to electric field (usually wet and contains electrolyte). Suitable electrode materials include carbon, gold, platinum, aluminum, etc. Suitable films and materials for use with the diaphragm cartridges of the present invention are disclosed in the following U.S. Pat. Nos. 6,376,971, 6,583,533, 6,664,718, which are herein incorporated by reference.

Referring again to the drawings, FIGS. 3 and 4 illustrate the inactive and active states, respectively, of the lens system 2 of FIGS. 1A-1C, which states correspond respectively to the inactive and active states of the electroactive/dielectric film 10 used in the system, as illustrated in FIGS. 2A and 2B. Specifically, in the inactive state, as illustrated in FIGS. 3A-3C, the electroactive film(s) is radially dilated which results in a corresponding dilation (i.e., inactive state as illustrated in FIG. 3A-3C) and contraction (i.e., active state as illustrated in FIGS. 4A-4C) of optical membranes 14 and, thus, lens 12. In comparing the inactive and active states of the film, we see that the diameter d of lens 12 is greater in the inactive state than in the active state (see $d_1$ in FIG. 3A vs. $d_2$ in FIG. 4A). As the lens' diameter d decreases, there is a corresponding increase in the thickness t of lens 12 (see $t_1$ in FIG. 3B vs. $t_2$ in FIG. 4B). This effect changes the focal length or magnification provided by the lens.

Figure 5:
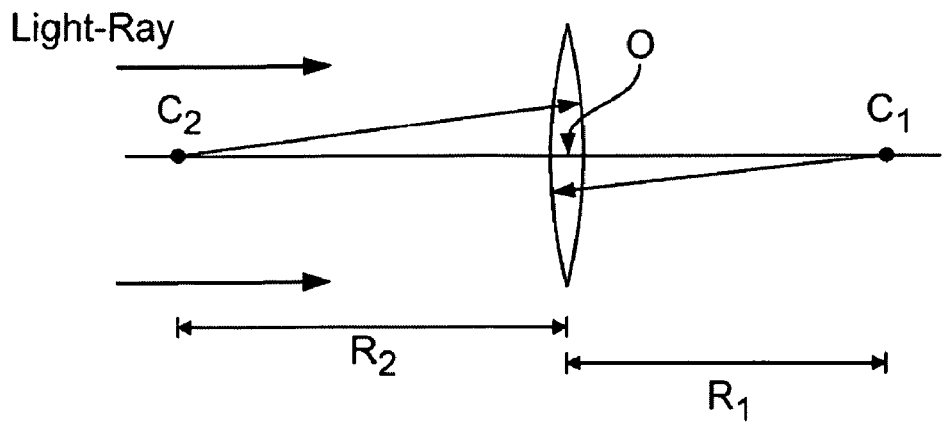
FIG. 5 is a schematic illustration of a lens and the parameters which affect the focal length of the lens.

Consider a conventional converging lens which has a bi-convex or double-convex configuration, as illustrated in FIG. 5, in which both bounding surfaces have a focusing effect on light-rays passing through the lens. With a light source coming from the left (as illustrated), the right side surface of the lens is considered to be the front surface, and the left side surface of the lens is considered to be the back surface of the lens. As such, C1 is the center of curvature of the front surface and C2 is the center of curvature of the back surface. The radius of curvature R1 of the front surface is the distance between the optic center O and the point C1. Likewise, the radius of curvature R2 of the back surface is the distance between points O and C2. By convention, the radius of curvature of a bounding surface is positive if its center of curvature lies behind the lens, and negative if its center of curvature lies in front of the lens. Thus, in FIG. 5, R1 is positive and R2 is negative. The focal length f of a lens is the distance from the optical center of the lens to the lens' focal point. For digital cameras, for example, the focal point is located on the camera's sensor. The lens maker's formula for a thin lens (i.e., lens' thickness d is small compared to its focal length) correlates a lens' focal length f to its radii of curvature as follows:

$$\frac{1}{f} = (n-1)\left[\frac{1}{R_1} - \frac{1}{R_2} + \frac{(n-1)d}{nR_1R_2}\right],$$

where n is the refractive index of the lens material.

While R1, R2 and f are fixed with conventional lenses, a liquid lens of the present invention allows the focal length (focus) of the lens to be selectable or tunable. This is accomplished by controlling or regulating the amount of voltage applied to the electroactive film 10. As the applied voltage increases, the radius r of the lens 12 decreases. Since the liquid volume of the lens is constant, the radii of curvature R1, R2 of the lens increase, which in turn increases the lens' focal length f. Conversely, as the voltage is reduced, the lens radius r increases thereby decreasing the radii of curvature and decreasing the lens' focal length f. Control electronics integrated with the platform device, e.g., camera, and interfaced with the lens system can be programmed and used to control the application of voltage to the electroactive film thereby modulating the focal length of the lens.

The previously described fluidic lens system of the present invention involves a liquid lens having a fixed volume of fluid. The present invention also includes fluidic lens systems 40, illustrated in FIG. 6, in which the volume of fluid present within the liquid lens can be varied in order to tune the focal length of the lens. More particularly, fluid is selectively transferred in and out of the fluidic lens chamber 42 and to and from a remote driving chamber 44 via a fluid passage 48. As is explained in greater detail below, this fluid transfer is accomplished by hydraulic means which provides a pumping action generated by an electroactive component employed as an actuator 46.

The lens portion of the illustrated lens system 40 includes converging or bi-convex lens. The "front" side (analogous to the same nomenclature used above with respect to the conventional lens of FIG. 5) is defined by a liquid lens 42 having a fluid chamber defined on its front side by a stretchable, transparent membrane 68 extending across an aperture 64 in a bottom or proximal lens housing 66, and defined on a back side by a rigid, transparent cover or plate 70. Plate 70 is held between bottom or proximal housing 66 and top or distal lens housing 72. On the opposite side of transparent plate 70 is a solid/rigid optical lens 76 having a converging backside which extends into conical aperture 80. Typically, lens 76 is made of polycarbonate or glass but may be made any other suitable material. The cone angle of aperture 80 dictates the angle at which light rays impinge upon plate 70. Positioned between plate 70 and rigid lens 76 is an optical stop 74 which blocks undesirable, i.e., scattered or random, light rays from passing into liquid lens 42. As with conventional lens systems, an infrared (IR) filter 78, set within a cutout within the face of top housing 72, is provided on the opposite side of rigid lens 76. Positioned on the opposite side of membrane 68 is an image sensor 82 which receives the image for digital processing by an image processing chip (not shown). Collectively, these components define the lens system or "stack" with the stack's focal length being adjustable by the radius of curvature of membrane 68 of liquid lens 42.

Driving portion of the lens system includes a fluidic driving chamber 44 defined on one end by a distal or top housing 58 having side walls. The proximal or bottom end of chamber 44 is receives a piston 54. A flexible diaphragm 56 formed of a non-permeable material extends annularly about the distal or chamber end 54a of piston 54 with its outer edge captured within the chamber housing 58. Diaphragm 56 acts to fluidly seal chamber 44 while enabling a bellows-type action to pump fluid in and out of the chamber.

The proximal or driving end 54b of piston 54 is operatively coupled to electroactive actuator 46 which acts to drive a piston 54 in and out of chamber 44. As piston 54 drives against chamber 44, the positive pressure placed in the chamber causes the lens fluid to flow out of the chamber through passageway 48 into lens chamber 42. Conversely, when piston 48 is withdrawn, a negative pressure is created within chamber 44, thereby causing the system's fluid to be drawn into chamber 44 and out of lens chamber 42.

Here, electroactive actuator 46 has a frustum diaphragm configuration in which an electroactive film 52 (as described with respect to FIGS. 2A and 2B) is held between outer and inner open frame members 50a, 50b. Such frustum-type actuators are described in detail in U.S. patent application Ser. Nos. 11/085,798, 11/085,804 and 11/618,577, each incorporated by reference in its entirety. Outer frame member 50a is held fixed within actuator housing 60 and inner frame member 50b is in turn coupled to a proximal end 54a of piston 54. Diaphragm 56 places a bias on piston 54 and on inner frame 50b in the direction of arrow 62b such that when a voltage is applied to actuator 46, inner frame member 50b is moved further in this biased direction, thereby creating a negative pressure in chamber 44 and drawing fluid from passage 48 in to chamber 44. As the voltage is removed, the reverse motion is experienced by piston 54 and inner frame 50b, creating a positive pressure in chamber 44 and forcing fluid into the passage 48 toward the lens chamber 42. The amount of voltage applied to actuator 46 may be selectively controlled to modulate the extent of pumping action undergone by the system, and thus, finely tuning the volume of fluid present in lens chamber 42. With the radius of lens chamber 42 being fixed, i.e., defined solely by the diameter of the aperture 64, an increase in the fluid volume within the lens will cause membrane 68 to extend radially outward toward image sensor 82, thereby changing the radius of curvature of liquid lens 42 and, thus, the focal length of the lens stack.

Figure 7:
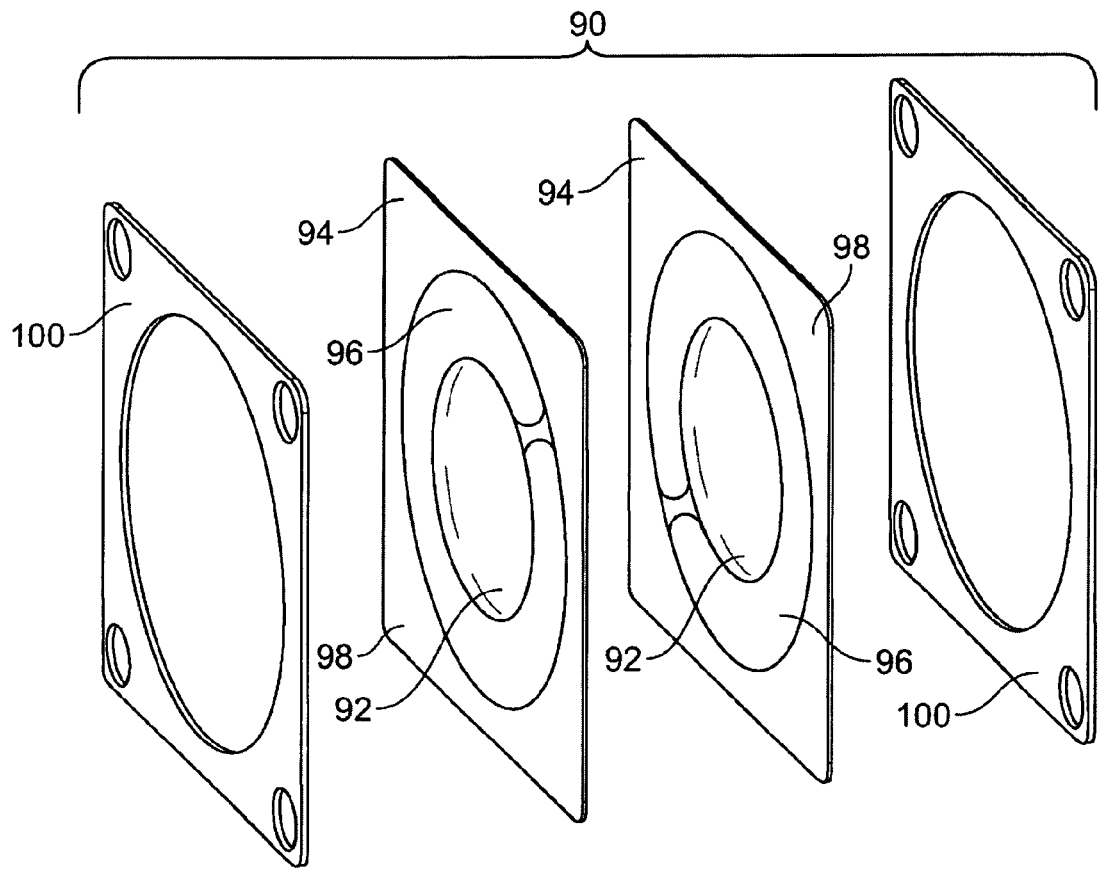
FIG. 7 is an exploded view of another optical system of the present invention which is employable as a light control aperture.

Turning now to FIG. 7, there is illustrated another optical system 90 of the present invention functions similarly to the eye's iris in that the diameter of the aperture defined by the iris is adjusted to regulate the amount of light passing therethrough. Optical system 90 includes a two-ply transparent/translucent membrane 92 which defines the light-passing aperture. Extending radially outward from at least a portion of each membrane 92 is an electroactive film including a dielectric layer 94, a portion of which is sandwiched between two electrode layers 96. As with the auto-focus lens system described above, a single film layer may alternatively be employed. The structure and function of the iris' electroactive films is as discussed above with respect to FIGS. 2A and 2B. In the illustrated embodiment, the electrode layers 96 are provided annularly about their associated membranes 92. Each electroactive film has an electrical contact portion 98 configured for electrical connection to a voltage source (not shown). Collectively, the optical membranes and electroactive film(s) define a diaphragm which is stretched and held about its perimeter by a frame or is otherwise sandwiched between two opposing open frame sides 100. While frame 100 is illustrated having a square configuration, any suitable configuration may be used. This composite structure, which may also be referred to as a cartridge, as with the subject lens systems, may have any suitable form fit and size, and may be incorporated into many types of optical devices.

Figure 6:
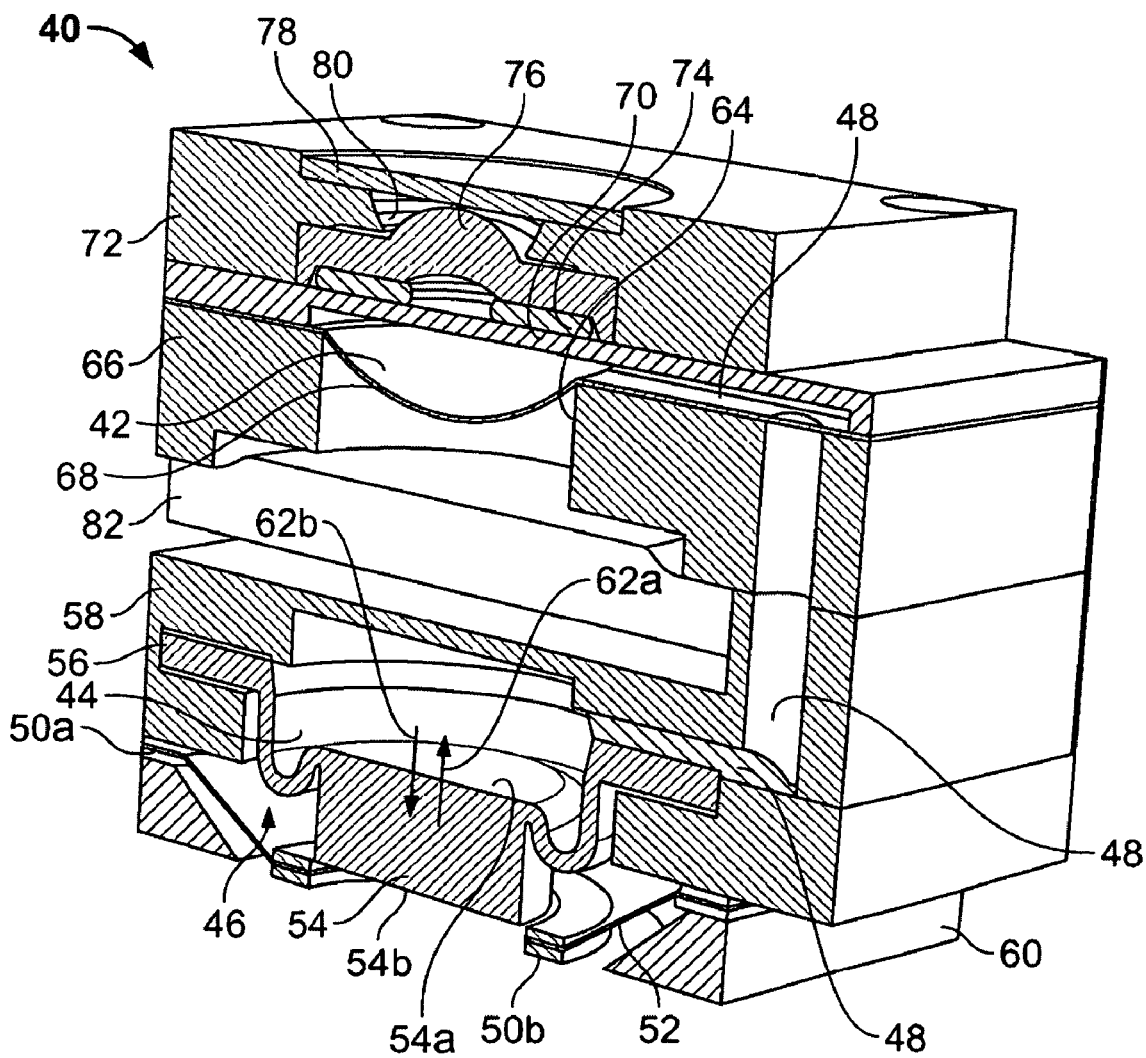
FIG. 6 is a perspective, cross-sectional view of another fluidic optical lens system of the present invention employing a variable volume of fluid.
Figure 8A:
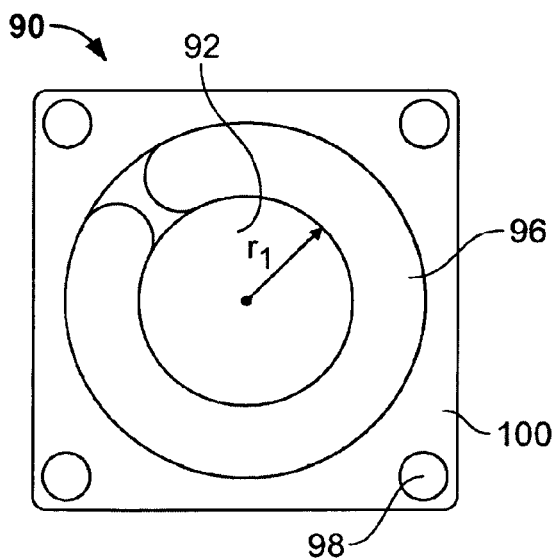
FIGS. 8A and 8B provide planar views of the optical system of FIG. 7 when in inactive (voltage off) and active (voltage on) states, respectively.
Figure 8B:
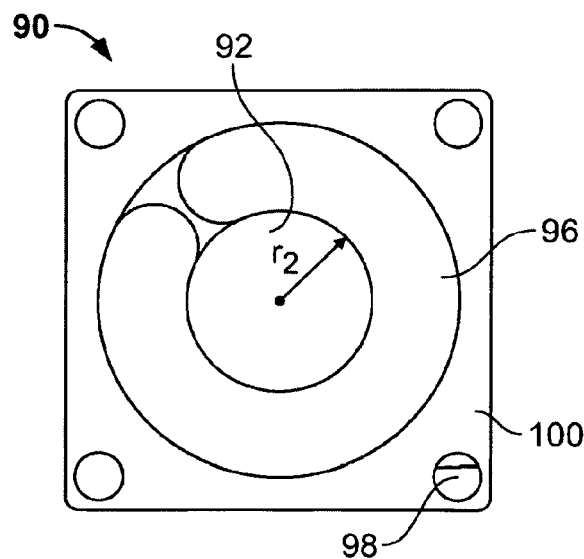

FIGS. 8A and 8B illustrate the inactive and active states, respectively, of optical system 90, which states correspond respectively to the inactive and active states of the electroactive film used in the system, as illustrated in FIGS. 2A and 2B, respectively. In the inactive state, as illustrated in FIG. 8A, the electroactive film(s) is radially dilated which results in a corresponding dilation of iris aperture 92, which in turn allows more light to pass therethrough. In the active state, as illustrated in FIG. 8B, the electroactive film(s) is radially contracted, which restricts or reduces the amount of light that can pass therethrough. In comparing the inactive and active states of the film, we see that the radius r of iris 92 is greater in the inactive state than in the active state (see $r_1$ in FIG. 8A vs. $r_2$ in FIG. 8B). Controlling the extent to which the radial dimension of iris 92 is dilated or contracted correspondingly adjusts the amount of light passing through the aperture. As such, system 90 is usable and useful with any lens system in which the amount of light impinging upon the lenses affects the image. For example, optical system 90 may be employed with either of the fixed-volume (FIGS. 1, 3 and 4) or variable-volume (FIG. 6) liquid lens systems of the present invention, as well as with conventional lens systems. In either context, adjustable aperture 90 is positioned on the "back" side of the lenses such that the amount of light impinging on the lenses is controlled. If a filter, such as IR filter 78 of the variable-volume lens system of FIG. 6, is employed, iris 90 may be positioned on either side of the filter.

Figure 9:
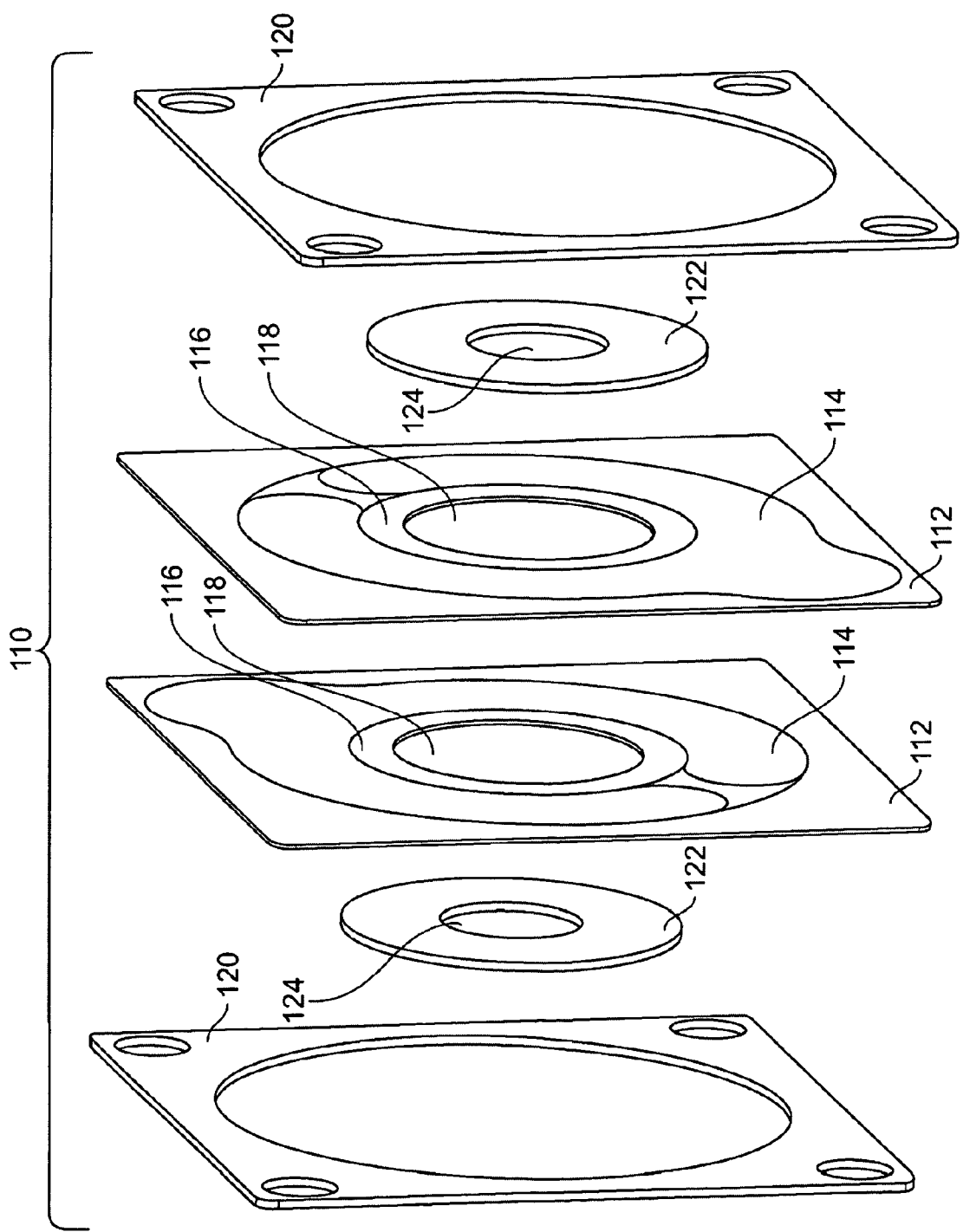
FIG. 9 is an exploded view of another optical system of the present invention which is employable as a light control aperture.
Figure 10B:
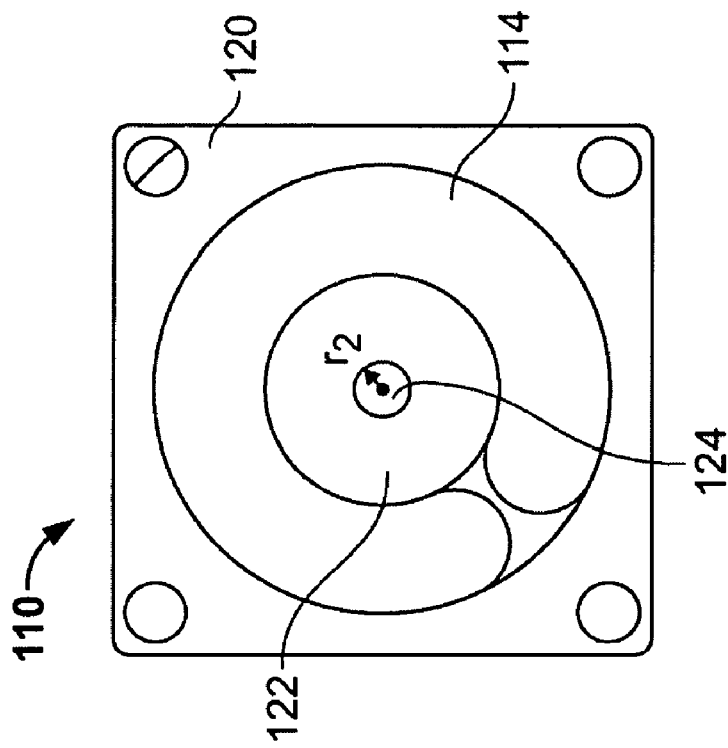
FIGS. 10A and 10B provide planar views of the optical system of FIG. 9 when in inactive (voltage off) and active (voltage on) states, respectively.
Figure 10A:
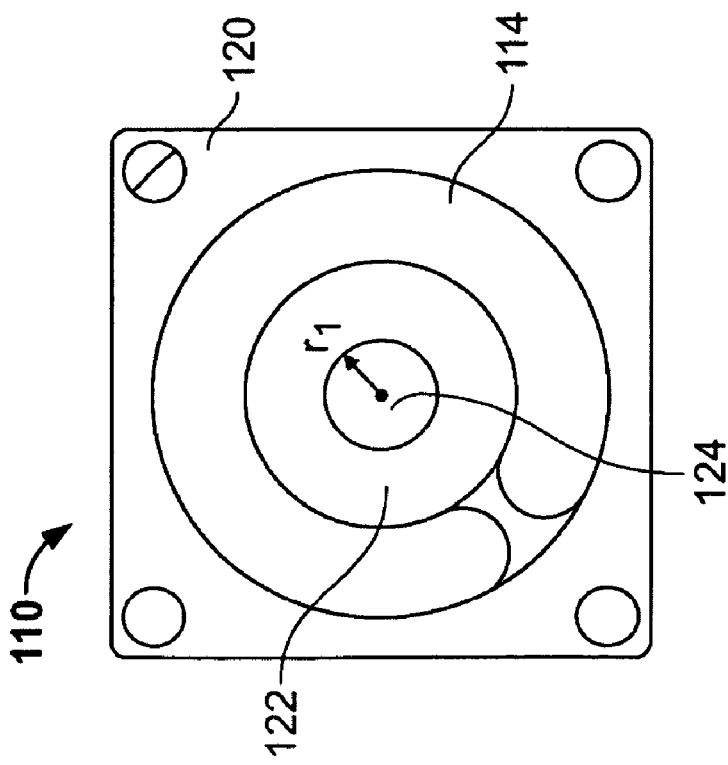

FIGS. 9, 10A and 10B illustrate another iris or aperture system 110 of the present invention. Aperture 110 is similarly constructed to aperture 90 of FIGS. 7 and 8, having two electroactive films 112, each having a dielectric layer 116 sandwiched between two electrode layers 14, with the high voltage electrodes facing towards each other. Frame sides 120 hold the films together in a cartridge structure while providing an open space or passage defining the working area of the subject apertures. A difference between aperture 110 and aperture 90 is that each of the dielectric polymer layers 116 has a cut-out 118 to define an opening therethrough. The cut-out is preferably circular, leaving behind an annular portion of dielectric material 116 which is opaque rather than transparent. A centrally positioned, opaque polymer disc 122 is provided on each film layer 112 and a frame side 120. Disc 122 has a central opening or aperture 124 which lies within cut-out 118 and through which light passes when operatively employed within an optical system. The outer perimeter of disc 122 may be sealed to the inner perimeter of dielectric film 116 by means of an adhesive or the two components may be made of materials that are self-adhesive, e.g., acrylic, silicone, etc. With an annular configuration, disc 122 evenly distributes the tension on layer 116. Additionally, the two components act to pre-strain each other. The same type of polymer may be used for dielectric layer 116 and disc 122;

however, the polymer types need not be the same. In either case, disc 122 is typically thicker and has a higher pre-strain than dielectric layer 116, making it "stronger" and stiffer than dielectric layer 116.

FIGS. 10A and 10B illustrate the inactive and active states, respectively, of optical system 110, which states correspond respectively to the inactive and active states of the electroactive film used in the system, as illustrated in FIGS. 2A and 2B, respectively. In the inactive state, as illustrated in FIG. 10A, the electroactive film(s) and dilatable disc(s) 116 are radially dilated which results in a corresponding dilation of disc aperture or opening 124, which in turn allows more light to pass therethrough. In the active state, as illustrated in FIG. 10B, the electroactive film(s) and dilatable disc(s) 116 are radially contracted which results in a corresponding contraction of disc aperture or opening 124, which in turn restricts or reduces the amount of light that can pass through aperture 124. In comparing the inactive and active states of the film, we see that the radius r of opening 124 is greater in the inactive state than in the active state (see $r_1$ in FIG. 10A vs. $r_2$ in FIG. 10B). Controlling the extent to which the radial dimension of opening 124 is dilated or contracted correspondingly adjusts the amount of light passing through it. As such, system 110 is also usable and useful with either of the fixed-volume (FIGS. 1, 3 and 4) or variable-volume (FIG. 6) liquid lens systems of the present invention, as well as with conventional lens systems.

Figure 11:
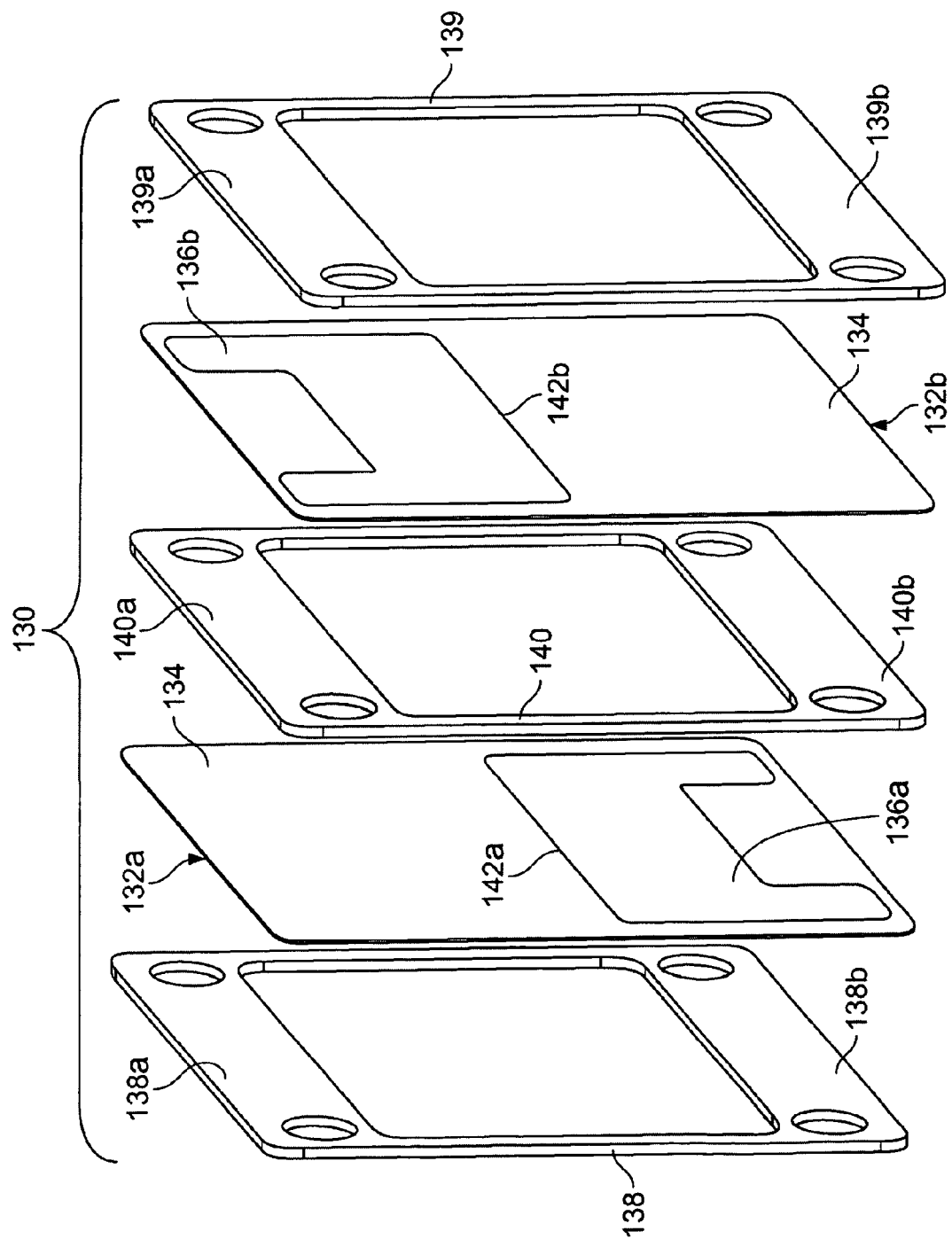
FIG. 11 is an exploded view of another optical system of the present invention which is employable as a shutter.
Figure 12B:
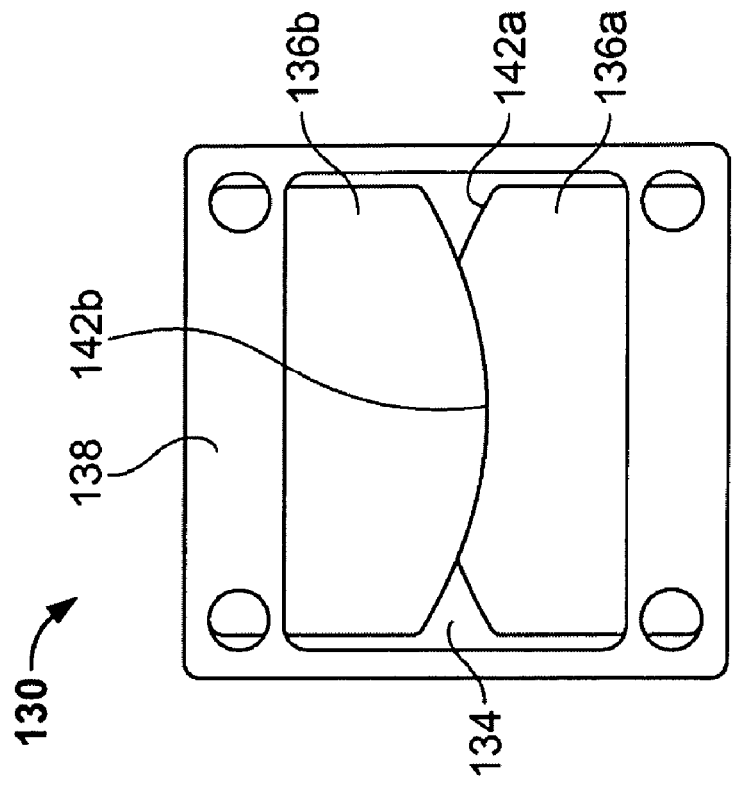
FIGS. 12A and 12B provide planar views of the optical system of FIG. 11 when in inactive (voltage off) and active (voltage on) states, respectively.
Figure 12A:
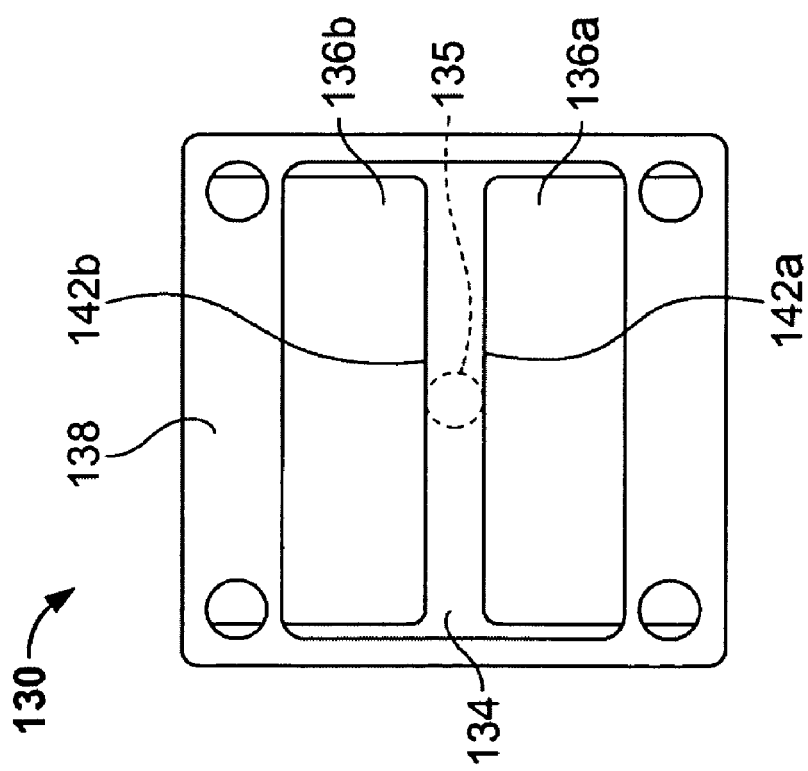

FIGS. 11, 12A and 12B illustrate shutter system 130 of the present invention which also utilizes electroactive films. Shutter 130 includes two electroactive film layers 132a and 132b. Each electroactive film 132a, 132b is comprised of a dielectric transparent/translucent polymer film 134 and an electrode pair 136 with the two electrodes disposed on opposite sides of each polymer film 134, the high voltage electrodes facing inward toward each other. The electrode pair 136a disposed on electroactive film 132a is positioned at a bottom or lower portion of the rectangularly-shaped film, while electrode pair 136b is disposed on a top or upper portion of electroactive film 136b which also has a rectangular shape. Three open frames with matching cut-out portions are employed to operatively hold films 132a, 132b. Two outer frames 138, 139 sandwich the films together while a third frame 140 is positioned between the two films. With the cartridge fully assembled, as illustrated in FIG. 12A, the front or centrally disposed edges 142a, 142b of the respective active areas, i.e., the electroded areas, are spaced a short distance apart when in their inactive states. With the interposed third frame 140, unlike the previously described cartridges, films 132a, 132b are not physically coupled together, however they may still be electrically coupled together and powered by the same power source. Further, the active portion of each film is held and stretched substantially uniformly on only these three sides, i.e., the frames hold these sides substantially close to their perimeters. As the front edges 142a, 142b, respectively, of each of the active areas is held in tension by the frame ends furthest from the edges, i.e., frame ends 138a, 139a, 140a for active area 136a and frame ends 138b, 139b, 140b for active area 136b, the tension or pre-strain placed on the front edges is less than that placed on the other edges of the active area. As such, the primary movement of the respective active regions upon actuation is along their front edges 142a, 142b.

FIGS. 12A and 12B illustrate the inactive and active states, respectively, of shutter system 130, which states correspond respectively to the inactive and active states of the electroactive film used in the system, as illustrated in FIGS. 2A and 2B, respectively. In the inactive state, as illustrated in FIG. 12A, the front edges 142a, 142b of the respective active areas of electroactive films 132a, 132b are spaced a distance apart thereby defining a transparent, open space between the active areas. This spacing is sufficient to expose the lens and/or aperture (in phantom) 135 that would be positioned behind the films. When the films are activated, as illustrated in FIG. 12B, the front edges 142a, 142b of the respective active areas are caused to expand linearly toward each other. When fully actuated, edges 142a and 142b overlap each other to the extent necessary to cover the lens and/or aperture (not shown). In the context of a camera, for example, the shutter is open (i.e., the films are inactive) when it is desirous to expose the image sensor to light, typically not more than about 30 ms. Shutter system 130 is usable and useful with any of the lens and aperture systems of the present invention, as well as with conventional optical systems.

While two films are used in the illustrated shutter embodiment, a single film or more than two films may be employed. For example, several or a plurality of films collectively defining an impeller configuration may be used. Further, the one or more shutter films may have any suitable number and shapes of opaque (electroded) and transparent/translucent portions. Because the shutter's function is to be in either one of two discrete states, i.e., open or closed, the variability of the open circular film configurations of the above-described aperture systems, is not necessary. However, a circular configuration (i.e., where the opaque electrode portion defines a circular transparent portion) maybe employed where the closed position of the aperture is such that area of the transparent/translucent portion is substantially negligible. In any case, the surface area of the opaque portion(s) of the electroactive film when expanded or extended upon activation covers the light-passing aperture.

Figure 13A:
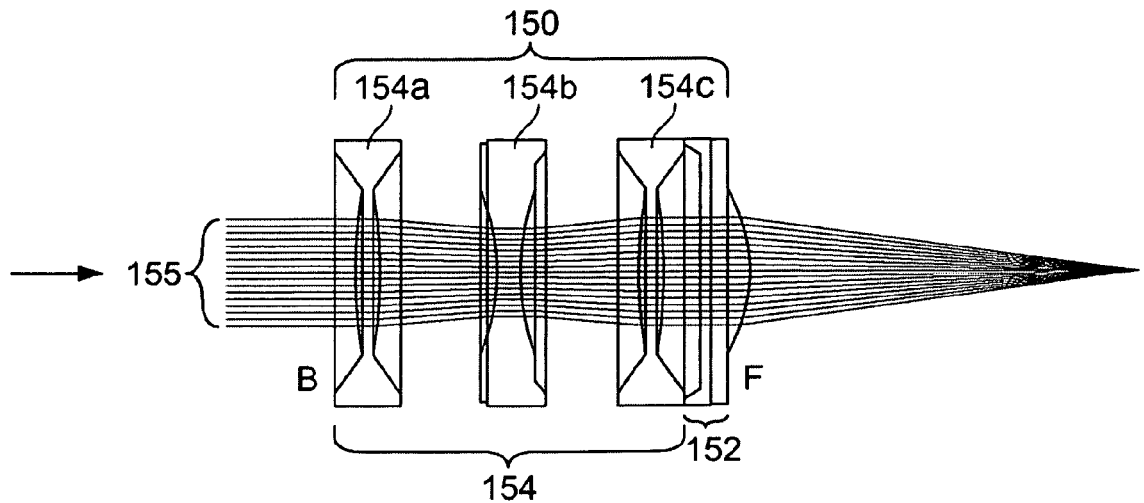
FIGS. 13A-13C are schematic illustrations of a conventional lens system in neutral, zoom-out and zoom-in positions, respectively.
Figure 13B:
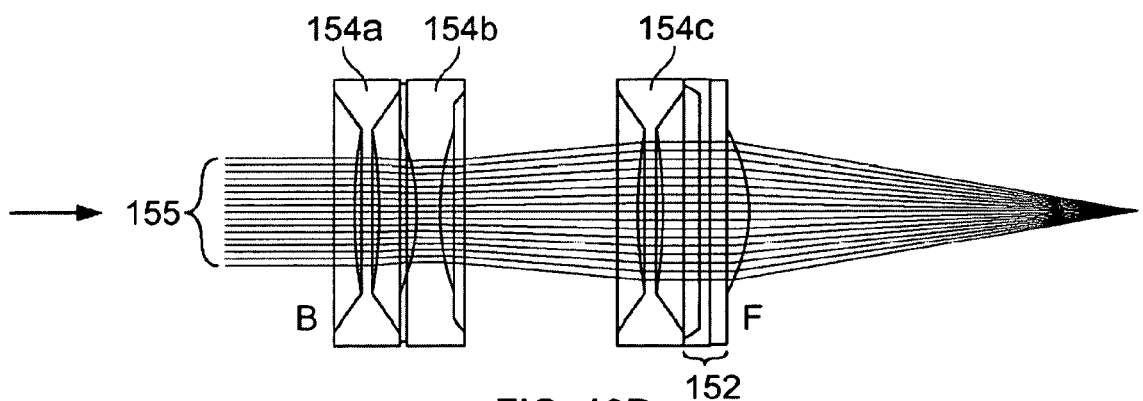
Figure 13C:
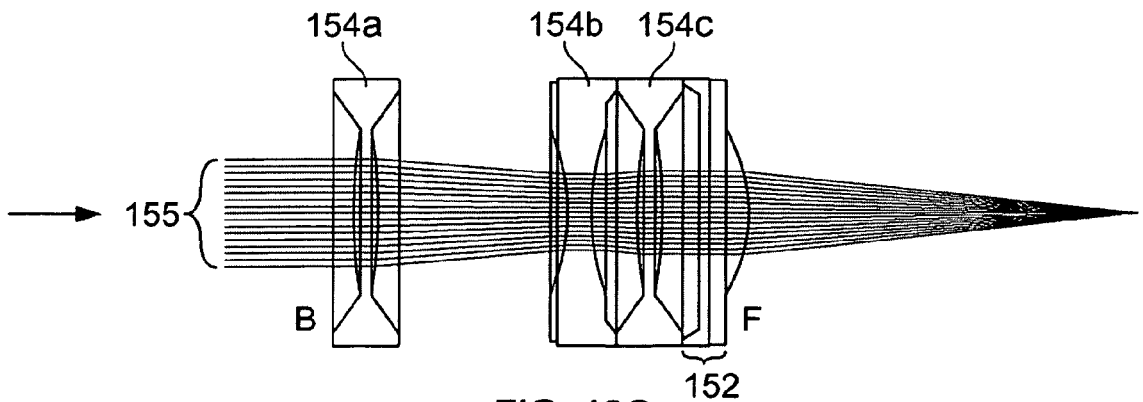

The present invention also provides optical systems with zoom capabilities. While more complex zoom lenses may have upwards of thirty individual lens elements, and multiple parts to move the lens elements, most conventional zoom lens systems follow the same basic design, as illustrated in FIGS. 13A-13C. Generally, a conventional zoom lens stack 150 consists of two parts: a focusing lens 152 similar to a standard, fixed-focal-length photographic lens preceded by an afocal zoom system 154, which does not focus the light, but alters the size of a beam of light 155 traveling through it, and thus the overall magnification of the lens system. Afocal zoom system 154 consists of an arrangement of fixed and movable lens elements. In zoom lens system 150, the afocal system 154 consists of two positive (converging) lenses of equal focal length 154a, 154c with a negative (diverging) lens 154b between them and having an absolute focal length less than half that of the positive lenses. Lenses 154a, 154c are fixed, but lens 154b can be moved axially along the longitudinal axis of the lens stack 150. In a more complex arrangement, lens 154a may also be movable. Movement of the lens(es) is usually performed by a complex arrangement of gears and cams in the lens housing, although some modern zoom lenses use computer-controlled servos to perform this positioning.

When diverging lens 154b is positioned equidistance between converging lenses 154a, 154c (see FIG. 13A), the system is neutral, i.e., the cross-sectional dimension of the collimated beam of light 155 entering the system remains substantially constant. In other words, there is no magnification of the image on which focusing lens 152 is focused. As diverging lens 154b moves towards the back B of the stack (see FIG. 13B), i.e., zooms in, the magnification of the system increases. Conversely, as diverging lens 154b moves towards the front F of the stack (see FIG. 13C), i.e., zooms out, the magnification of the system decreases.

The focal length of a zoom lens is given as a range of two figures, the first is the focal length (mm) when the zoom is not being used and the second is the focal length (mm) when the zoom is fully extended. The zoom ratio, then, is the ratio of the focal length with the zoom fully extended to the focal length when the zoom is not being used. A typical conventional digital camera has a focal length of 35 mm without zoom and a focal length of 105 mm with zoom. Thus, the camera's zoom ratio is about 3×. In order to increase a camera's zoom ratio, either larger lenses or more of them must be used. This in turn requires more space for the lenses as well as for the cams and gears needed to move the lenses.

Moreover, as the magnification of a zoom lens changes, it is necessary to compensate for any movement of the focal plane (commonly referred to as "shake") to keep the focused image sharp. In conventional lens systems, this compensation may be done by mechanical means, i.e., moving the complete lens assembly as the magnification of the lens changes, or optically, i.e., arranging the position of the focal plane to vary as little as possible as the lens is zoomed.

It is for at least the aforementioned space requirements and the consequential weight added to an optical system that zoom capabilities are not provided in very compact optical systems such as cell phone cameras. The present invention overcomes these shortcomings of conventional optical zoom systems by utilizing one or more of the subject liquid lenses in a lens stack assembly to provide zoom capabilities with reduced space requirements and with less weight added to the overall system or device.

Figure 14A:
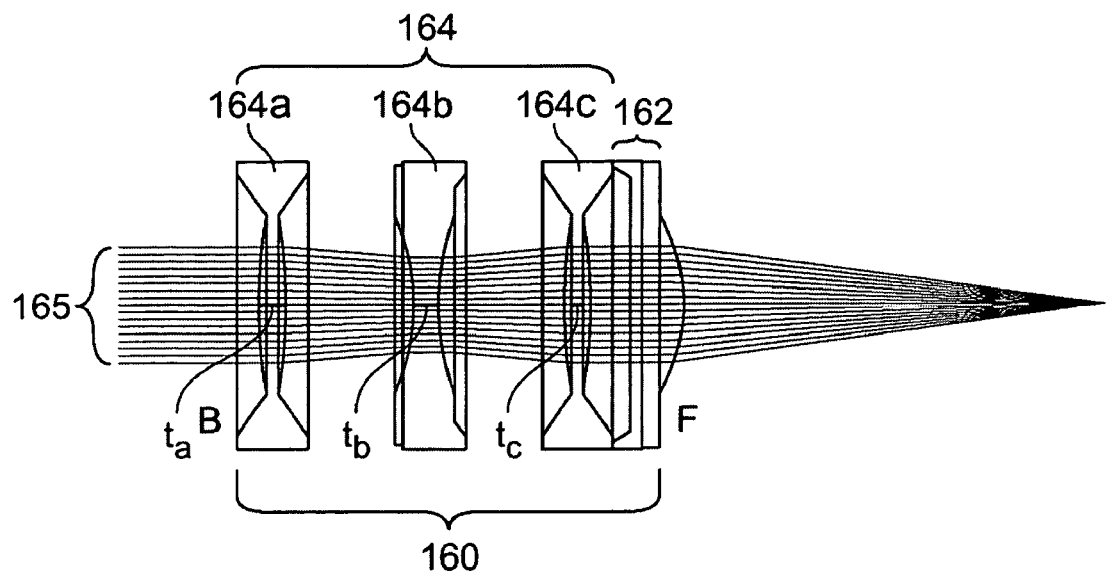
FIGS. 14A-14C are schematic illustrations of a liquid lens system of the present invention in the neutral, zoom-out and zoom-in positions, respectively.
Figure 14B:
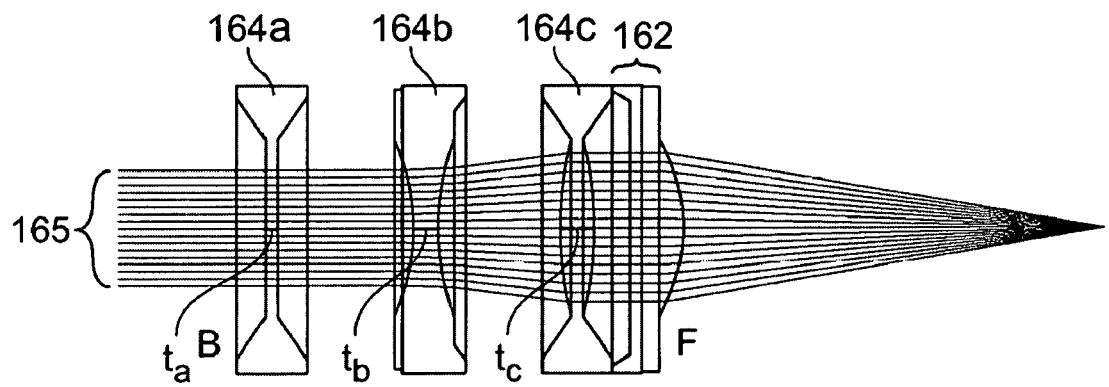
Figure 14C:
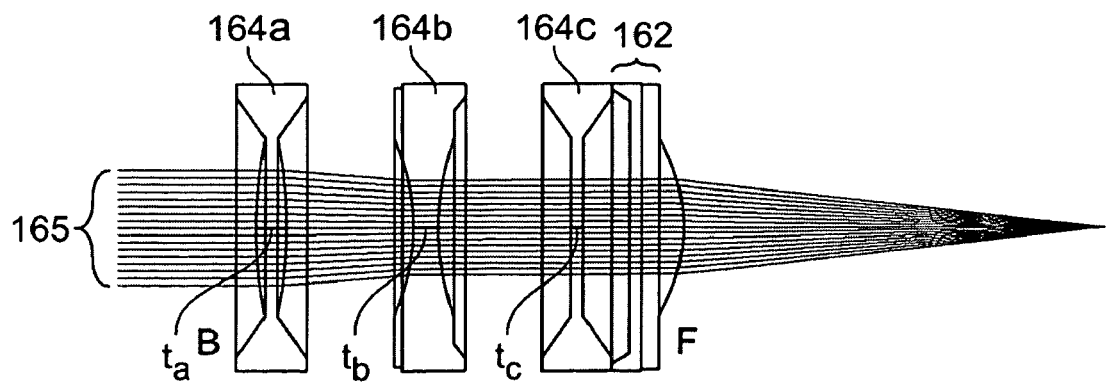

Referring now to FIGS. 14A-14C, there is shown a schematic representation of an optical lens system or stack 160 of the present invention having zoom capabilities. Lens system 160 includes focusing lens 162 at a back end B of lens stack 160 and an afocal zoom system 164 proximal thereto. Unlike the conventional afocal zoom systems discussed above, zoom system 164 does not include any moving lens elements, i.e., all of the lenses are fixed as their movement is not required to effect image magnification. Notwithstanding, it is contemplated that the electroactive film actuators disclosed in the patent references incorporated herein may be employed to linearly translate the lens elements to affect a zoom effect.

In the illustrated embodiment, afocal zoom system 164 consists of two positive (converging) lenses 164a, 164c and a negative (diverging) lens 164b therebetween. One or more of the afocal lenses may be a liquid lens, such as the liquid lens of FIGS. 1A-1C. In one variation of the invention, at least two of the afocal lenses are liquid lenses. In one embodiment of the latter variation, converging lenses 164a and 164c are liquid lenses and diverging lens 164b is a conventional solid lens. However, any two (or more) of the afocal lenses may have a liquid configuration. Either a liquid lens of the present invention or a conventional solid lens may be used for focusing lens 162, which is converging on its front end. Alternatively, afocal lens 164c and focusing lens 162 may be integrated into a single converging lens, which may be liquid or solid; however, image quality may be compromised.

As illustrated in FIGS. 14B and 14C, no translational (axial) movement of any of the afocal lenses, including diverging lens 164b, is necessary to vary magnification of lens stack 160, whether zooming in (as in FIG. 14B) or zooming out (as in FIG. 14C). Instead, the thicknesses ($t_a$, $t_b$, $t_c$) of the respective liquid lenses may be adjusted. The change in lens thickness may be effected by varying the diameter/radius of the lens, as with the fixed volume liquid lens system of FIGS. 1A-1C, or by varying the volume of liquid within the lens chamber, as with the variable volume liquid lens system of FIG. 6, where the form fit of the liquid lens systems may be varied to accommodate a zoom lens stack. With either configuration, when the afocal lens stack 164 is in the neutral configuration (no magnification) illustrated in FIG. 14A, each of the afocal lenses as a selected thickness $t_a$, $t_b$, $t_c$, respectively. To zoom out from the neutral configuration (see FIG. 14B), the thickness $t_a$ of lens 164a is reduced and the thickness $t_b$ of is increased proportionately. To zoom in from the neutral configuration (see FIG. 14C), the thickness $t_a$ of lens 164a is increased and the thickness $t_c$ of is decreased proportionately. As the thickness $t_b$ of diverging lens 164b in this embodiment remains constant in any zoom configuration (neutral, zoom out, zoom in), a solid lens having a fixed thickness may be readily employed in lieu of a liquid lens. It is to be understood, however, that any combination of liquid and solid lenses, and less or more than three afocal lenses may be employed with the optical zoom systems of the present invention.

In any case, without the need to linearly translate any of the lenses (or with only a minimum number of linearly translatable lenses) of the afocal lens assembly to effect magnification, the required spacing between the respective lenses is reduced and the space that would otherwise be required for the cam mechanisms for translating the lenses is eliminated. The greater flexibility in space requirements increases the theoretical focal length of the lens assembly when in the zoom mode. Thus, depending on the size (thickness) of the lenses, the percentage of those that have adjustable thicknesses, and the spacing placed between them, the zoom ratio of the subject optical systems may be made to be greater than 3×, and even greater than 10× or more.

Methods of the present invention associated with the subject optical systems, devices, components and elements are contemplated. For example, such methods may include selectively focusing a lens on an image, selectively adjusting light exposed to a lens or magnifying an image using a lens assembly. The methods may comprise the act of providing a suitable device or system in which the subject inventions are employed, which provision may be performed by the end user. In other words, the "providing" (e.g., a pump, valve, reflector, etc.) merely requires the end user obtain, access, approach, position, set-up, activate, power-up or otherwise act to provide the requisite device in the subject method. The subject methods may include each of the mechanical activities associated with use of the devices described as well as electrical activity. As such, methodology implicit to the use of the devices described forms part of the invention. Further, electrical hardware and/or software control and power supplies adapted to effect the methods form part of the present invention.

Yet another aspect of the invention includes kits having any combination of devices described herein—whether provided in packaged combination or assembled by a technician for operating use, instructions for use, etc. A kit may include any number of optical systems according to the present invention. A kit may include various other components for use with the optical systems including mechanical or electrical connectors, power supplies, etc. The subject kits may also include written instructions for use of the devices or their assembly. Such instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., CD-ROM, diskette, etc. In yet other embodiments, the actual instructions are not present in the kit, but means for obtaining the instructions from a remote source, e.g. via the Internet, are provided. An example of this embodiment is a kit that includes a web address where the instructions can be viewed and/or from which the instructions can be downloaded. As with the instructions, this means for obtaining the instructions is recorded on suitable media.

As for other details of the present invention, materials and alternate related configurations may be employed as within the level of those with skill in the relevant art. The same may hold true with respect to method-based aspects of the invention in terms of additional acts as commonly or logically employed. In addition, though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. Any number of the individual parts or subassemblies shown may be integrated in their design. Such changes or others may be undertaken or guided by the principles of design for assembly.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in the appended claims, the singular forms "a," "an," "said," and "the" include plural referents unless the specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth n the claims. Stated otherwise, unless specifically defined herein, all technical and scientific terms used herein are to be given as broad a commonly understood meaning as possible while maintaining claim validity.

In all, the breadth of the present invention is not to be limited by the examples provided. That being said, we claim:

1. An optical device comprising:
   a two ply transparent/translucent membrane where a perimeter of each ply of the transparent/translucent is sealed to define a chamber containing an optical fluid therein;
   at least one electroactive film comprising a dielectric layer and two electrode layers, wherein at least a portion of the dielectric layer is sandwiched between the electrodes, the electroactive film located at the perimeter of the transparent/translucent membrane; and
   wherein activation of the at least one electroactive film affects a dimension of the transparent membrane.

2. The optical device of claim 1, wherein the dielectric layer defines the transparent/translucent membrane.

3. The optical device of claim 1, wherein the dimension is a diameter or a thickness.

4. The optical device of claim 1, wherein the affected dimension is the thickness of the chamber.

5. The optical device of claim 4, wherein the chamber has a variable diameter and a fixed volume.

6. The optical device of claim 4, wherein the chamber has a fixed diameter and a variable volume.

7. An optical system comprising:
   at least one fluidic lens; and
   at least one electroactive film associated with the at least one fluid lens, wherein activation of the at least one electroactive film affects a focal length of the fluidic lens wherein a diameter dimension of the fluidic lens is unaffected by activation of the at least one electroactive film.

8. The optical system of claim 7 wherein the at least one fluidic lens contains a fixed volume of fluid.

9. The optical system of claim 7, wherein the at least one fluidic lens contains a variable volume of fluid.

10. The optical system of claim 9, further comprising hydraulic means to vary the volume of optical fluid with the chamber 11. The optical system of claim 10, wherein the hydraulic means comprises an electroactive film.

12. The optical system of claim 7 wherein activation of the at least one electroactive film affects a diameter dimension of the fluidic lens.

13. The optical system of claim 7 wherein the optical parameter is magnification.

14. The optical system of claim 13, wherein a linear position of the at least one fluidic lens remains constant upon activation of the at least one electroactive film.

15. The optical system of claim 7, wherein activation of the at least one electroactive film affects a dimension of the at least one fluidic lens.

16. An optical system comprising:
   a focusing lens element; and
   an afocal lens element positioned relative to the focusing lens;
   wherein at least one of the lens elements comprises at least one fluidic lens and at least one electroactive film associated with the at least one fluidic lens for adjusting an optical parameter of the system wherein the position of the afocal lens element relative to the focusing lens element remains constant upon activation of the at least one electroactive film.

17. The optical system of claim 16, wherein the afocal lens element comprises an assembly of lenses wherein one of such lenses is a fluidic lens and activation of the at least one electroactive film adjusts the magnification of the afocal lens element.

18. An optical system comprising:
   a focusing lens element: and
   an afocal lens element positioned relative to the focusing lens;
   wherein at least one of the lens elements comprises at least one fluidic lens and at least one electroactive film associated with the at least one fluidic lens for adjusting an optical parameter of the system wherein the afocal lens element further comprises at least two other lens elements wherein the at least one fluid lens is positioned in between the two other lens elements.

19. An optical device comprising:
   at least one electroactive film comprising at least one opaque region and at least one transparent/translucent region, wherein activation of the at least one electroactive film changes a surface area of the transparent/translucent region relative to a surface area of the opaque region, wherein such change modulates the amount of light passing through the at least one transparent/translucent region.

20. The optical device of claim 19, wherein the at least one opaque region of the film comprises at least one electrode layer.

21. The optical device of claim 19, wherein the at least one transparent/translucent region of the film comprises a dielectric material.

22. The optical device of claim 19, wherein the intersection between the at least one opaque region and the at least one transparent/translucent region defines a straight line when the at least one electroactive film is inactive.

23. The optical device of claim 19, wherein the intersection between the at least one opaque region and the at least one transparent/translucent region defines a curved line when the at least one electroactive film is inactive.

* * * * *